March 7, 1933.  T. F. MOONEY  1,899,974
MACHINE FOR MANUFACTURING CERAMIC OBJECTS
Filed April 17, 1930
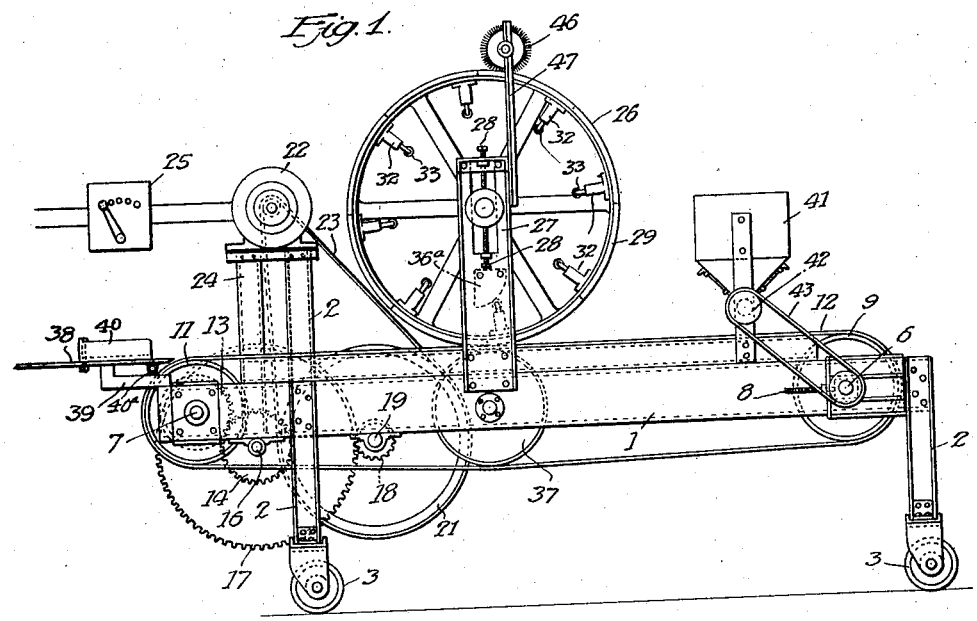
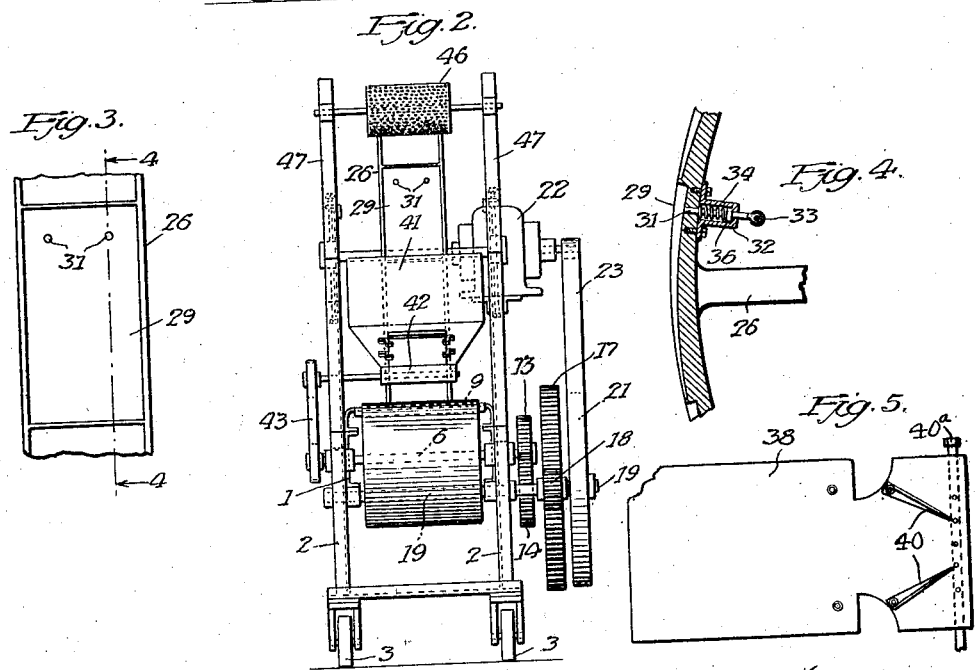
Inventor
Thomas Fred Mooney
Witness
R. B. Davison
By Wilson, Dawell, McCanna & Rehm
Attys.

Patented Mar. 7, 1933

1,899,974

UNITED STATES PATENT OFFICE

THOMAS FRED MOONEY, OF NEW LEXINGTON, OHIO, ASSIGNOR TO LUDOWICI-CELADON COMPANY, OF CHICAGO, ILLINOIS, A CORPORATION OF ILLINOIS

MACHINE FOR MANUFACTURING CERAMIC OBJECTS

Application filed April 17, 1930. Serial No. 444,896.

This invention relates to the manufacture of ceramic objects such as for example, tile, bricks, shingles, etc. and has for its purpose to provide a machine which will form, shape and trim the desired article from a column of clay or shale.

In accordance with this invention a machine is provided which will receive a column of clay from a source of supply such as an auger machine and which will form the desired articles directly from the column of clay. The machine may be provided with means which will permit it to be synchronized with the flow of clay from the supplying machine. In other words the speed of the forming machine so provided may be varied and adjusted to the exact speed of movement of the column of clay. Means may also be provided for adding different materials or embellishments to the column of clay to produce desired effects thereon. As a forming medium the machine utilizes a drum-like mold operable over the column of clay to shape and trim the desired article and in conjunction with a lower roll situated upon the opposite side of the column as a support for the column at this point.

A better understanding will be had of this invention from a consideration of the following detailed description given in connection with the drawing in which a machine for forming tiles is illustrated. It is understood that a machine of this character is shown and described for purposes of illustration only and that other articles may be made upon similarly constructed machines.

In the drawing:

Fig. 1 is a side elevation of a machine embodying the principles of this invention.

Fig. 2 is an end elevation of the machine illustrated in Fig. 1.

Fig. 3 is a fragmentary front elevation of one mold formed in the drum, and

Fig. 4 is a section on line 4—4 of Fig. 3.

Fig. 5 is a fragmentary plan view of the table portion for receiving the finished articles.

In the present instance the machine embodying this invention is a portable machine arranged to be movable to receive the discharge of any one of a series of supplying machines such as auger machines. The machine is supported upon a frame-work comprising horizontal beams 1 supported upon legs 2, the latter being provided with rollers 3.

At each end of the beams there are journalled transverse shafts 6 and 7, shaft 6 being adjustable longitudinally of the beam by means of adjusting screws 8. The shafts carry pulleys 9 and 11 respectively, over which travels a conveyor in the form of a belt 12.

The conveyor is positively driven by a suitable motor as will now be described. One end of the conveyor is placed at the discharge of a source of supply such as an auger machine. Shaft 7 has secured thereto a gear 13 which meshes with an idler gear 14 secured to a shaft 16 journalled in bearings secured to the lower edge of beams 1. Shaft 16 also carries a relatively larger gear 17 which engages a pinion 18 upon a shaft 19. Shaft 19 has secured thereto a pulley 21 which is belted to the driving motor 22 by a belt 23.

The motor is mounted upon standards 24 secured to beams 1 and rear legs 2 which are extended upwardly above beams 1 for that purpose. The motor 22 may be driven from any suitable source of current through a variable speed device 25. By means of the variable speed device 25 the motor 22 and conveyor 12 may be regulated to the exact speed of the discharge of the column of clay being discharged from the auger machine. Therefore by a proper regulation of the speed of the motor 22 the clay or other material may be taken from the auger machine without distending, compacting or buckling the column of clay.

Mounted directly over the conveyor at approximately the center thereof is a drum-like wheel 26 journalled in bearings carried by standards 27 extending upwardly from and secured to beams 1. The wheel 26 may be adjusted vertically by means of screws 28 in order to bring the outer edges of the rim of the wheel into contact with the conveyor to be frictionally driven thereby. The wheel of course may be positively driven if desired.

The periphery of the wheel 26 is formed with a series of forming molds 29. In the present illustration the molds have the shape of roofing shingles, and more particularly old shingles to similate old and warped roofing shingles in order that the clay product formed by the wheel will appear similar to old and warped shingles. Adjacent one end of each of the molds each mold is provided with a pair of punches to form two apertures in the clay shingle by means of which it may be secured in place. The punches comprise a round punch member 31 supported within a housing 32 with the inner end of the punch projecting inwardly therefrom and having a roller 33 secured thereto. The punch is normally retained in inoperative position by a spring 34 placed under compression between the inner surface of the rim of the wheel and a collar 36 pinned to the punch. The rollers 33 are arranged to ride over a pair of adjustable cams 36ª to cause the punches to be projected inwardly and through the clay to form apertures therein.

Immediately below wheel 26 and upon the opposite side of the conveyor is a contacting or supporting roll 37 arranged with its point of tangency directly beneath the wheel 26. The conveyor is thus supported between the two rollers at the point of contact of the mold portion of the wheel with the conveyor.

Adjacent the discharge end of the conveyor is a table 38 supported upon brackets 39 secured to the ends of beams 1. The table 38 is arranged to receive the formed articles from the conveyor. Adjustably secured to and adjacent one end of the table 38 are a pair of trimming knives 40 arranged to trim the edges of the completed articles as they are fed onto the table. In order to aid in the passage of the completed articles over the table oil may be supplied to the upper surface of the table through a pipe 40a having perforations therethrough communicating with perforations in the table.

On the leading end of the conveyor preceding the roll 26 is mounted a hopper 41 designed to contain coloring matter or articles to be distributed upon the column of clay for decorative purposes. The mouth of the hopper is controlled by a rotary feeding device and gate 42 arranged to be driven from shaft 6 by means of belt 43.

In order to prevent the formed clay from adhering to the molds there is provided a brush 46 mounted upon brackets 47 secured to standards 27, the brush being arranged to engage the molds. The brush serves to clean the molds and apply an oil thereto if desired. In the present illustration the brush is not positively rotated but may be if desired.

It is believed that the operation of the machine is apparent from the foregoing and will be briefly summarized as follows:

The machine is moved to place the leading end of the conveyor adjacent the discharge end of an auger machine or any other type machine discharging clay therefrom. The discharge or column of clay coming from the auger machine encounters the end of the conveyor and is carried forward thereby under the discharge end 42 of hopper 41. The column of clay may thereby be colored or otherwise decorated by the contents of the hopper 41 if desired.

It is understood that the speed of travel of the conveyor is closely regulated to be equal to the rate of movement of the discharge of the column of clay from the auger machine. This must be accurately adjusted in order that the column of clay is not stretched nor compressed nor caused to buckle. After passing under the mouth of the hopper 41 the column of clay passes between wheel 26 and rolls 37 the former through the medium of molds 29 therein trims and surfaces the clay into shingle shapes. The shingle shapes are then carried by the conveyor onto table 38 from which they may be taken to the next operation in their manufacture.

It is obvious that minor changes may be made in the details of construction without departing from the spirit and scope of the invention as defined in the claims appended hereto.

I claim:

1. In a machine for forming clay products, a conveyor for receiving and supporting a column of clay, means for positively moving said conveyor, a drum mounted for rotation over said conveyor and having molds in the outer surface thereof and a table for receiving the molded articles from said conveyor, said table having means thereon for triming the edges of said molded articles.

2. In a machine for forming clay products, a conveyor for receiving and supporting a column of clay, means for positively moving said conveyor, a drum mounted for rotation over said conveyor and having molds in the outer surface thereof and a table for receiving the molded articles from said conveyor, said table having means thereon for trimming the edges of said molded articles, and means for lubricating a portion of the surface of said table.

3. In a machine for forming clay products, a conveyor for receiving and supporting a continuously extruded column of clay, means for positively moving said conveyor, means for varying the rate of movement of said conveyor with respect to the clay column being delivered thereto for synchronizing the movement of the conveyor with the movement of the column of clay, a rotary drum mounted for rotation over said conveyor, molds on the periphery of said drum, and a support under said conveyor at a point opposite said drum.

4. In a machine for forming clay products, a conveyor for receiving and supporting a continuously extruded column of clay, means for positively moving said conveyor at a speed in synchronism with the speed of movement of the clay delivered thereto, and a forming drum mounted for rotation over said conveyor.

5. In a machine for forming clay products, a conveyor for receiving and supporting a continuously extruded column of clay, means for positively moving said conveyor at a speed in synchronism with the speed of movement of the clay delivered thereto, a forming drum mounted for rotation over said conveyor, and means for driving said drum at a speed equal to the speed of movement of said conveyor.

6. In a machine for forming clay products, a conveyor for receiving and supporting a column of clay, means for positively moving said conveyor, a rotary drum mounted for rotation over said conveyor and having forming molds on the outer surface thereof, punches on said drum to form apertures in the article being formed, means for normally holding said punches retracted, means included a fixed cam arranged to engage said punches to cause the latter to be projected through said drum and into the column of clay as the molds contact with the column of clay, and a support under said conveyor at a point opposite said drum.

7. In a machine for forming clay products, a conveyor for receiving and supporting a column of clay, means for positively moving said conveyor at a predetermined rate of travel, a molding drum mounted for rotation over said conveyor with the peripheral surface thereof in close proximity to said conveyor, said drum having rim portions in frictional contact with said conveyor whereby said conveyor drives the drum, and a support disposed beneath said conveyor and in contact therewith at a point opposite said drum.

8. In a machine for forming clay products, a conveyor for receiving and supporting a column of clay, means for positively moving said conveyor at a predetermined rate of travel, a rotary molding drum mounted above said conveyor with its periphery in proximity thereto, punches on said drum to form apertures in the clay being conveyed thereunder, means for normally holding said punches in retracted position, and means for moving said punches through said drum and into the column of clay as the drum contacts with the column of clay.

9. In a machine for making tile, a conveyor for receiving and supporting a continuously extruded column of clay, a rotary molding drum mounted for rotation above said conveyor, said drum having molds therein of sufficient depth to form a complete tile therein, and the peripheral edges of said drum being in close proximity to said conveyor, means for positively moving said conveyor at a predetermined rate of travel relatively to the movement of said continuously extruded column of clay, and a support mounted beneath said conveyor at a point opposite said drum, said support being in contact with said conveyor.

In witness of the foregoing I affix my signature.

THOMAS FRED MOONEY.